(12) United States Patent
Tucker et al.

(10) Patent No.: US 6,429,991 B1
(45) Date of Patent: Aug. 6, 2002

(54) REDUCING BIAS CURRENT SETTLING TIME IN MAGNETO-RESISTIVE HEAD PRE-AMPLIFIERS

(75) Inventors: Scott J. Tucker, Raleigh; Wei Hong, Durham, both of NC (US)

(73) Assignee: Mitsubishi Electric and Electronics U.S.A., Inc., Durham, NC (US)

( * ) Notice: Subject to any disclaimer, the term of this patent is extended or adjusted under 35 U.S.C. 154(b) by 0 days.

(21) Appl. No.: 09/291,328

(22) Filed: Apr. 15, 1999

(51) Int. Cl.[7] .................................................. G11B 5/03
(52) U.S. Cl. ........................................... 360/66; 360/46
(58) Field of Search ............................... 360/66, 67, 46, 360/53; 327/110, 108, 109

(56) References Cited

U.S. PATENT DOCUMENTS

| | | |
|---|---|---|
| 4,262,313 A | 4/1981 | Mouri |
| 4,712,144 A * | 12/1987 | Klaassen ..................... 360/67 |
| 4,777,545 A | 10/1988 | Shoji et al. |
| 5,278,700 A | 1/1994 | Sutliff et al. |
| 5,408,365 A * | 4/1995 | Van Doorn et al. ........... 360/46 |
| 5,412,518 A | 5/1995 | Christner et al. |
| 5,488,518 A | 1/1996 | Shier |
| 5,523,898 A | 6/1996 | Jove et al. |
| 5,559,646 A | 9/1996 | Voorman et al. |
| 5,619,386 A * | 4/1997 | Voorman et al. .............. 360/67 |
| 5,633,486 A | 5/1997 | Burg et al. |
| 5,691,663 A | 11/1997 | Nayebi et al. |
| 5,691,720 A | 11/1997 | Wang et al. |
| 5,696,512 A | 12/1997 | Takiguchi |
| 5,701,213 A | 12/1997 | Cameron et al. |
| 5,706,151 A | 1/1998 | Smith |
| 5,869,988 A * | 2/1999 | Jusuf et al. .................. 327/110 |
| 6,038,090 A * | 3/2000 | Freitas ........................ 360/46 |

* cited by examiner

Primary Examiner—David Hudspeth
Assistant Examiner—K. Wong
(74) Attorney, Agent, or Firm—Burns, Doane, Swecker & Mathis, L.L.P.

(57) ABSTRACT

An arrangement for reading data from a magnetic data carrier using a magneto-resistive (MR) head. A bias current source supplies the MR head with a bias current adjustable after MR head change. A bias current control signal having multiple control bits is used for adjusting the bias current. A noise shunting capacitor is connected to the MR head for reducing noise caused by the bias current. A discharging circuit is coupled to the noise shunting capacitor to discharge the capacitor when the bias current is being adjusted, in order to reduce bias current settling time. The discharging circuit comprises a pair of switches for each control bit of the bias current control signal. One of the switches is connected to a positive plate of the noise shunting capacitor, and another switch is coupled to a negative plate of the capacitor. The switches are controlled by a one-shot multivibrator triggered by a falling edge of the corresponding control bit. Weighting resistors are connected to each switch for weighting a discharge current produced by the switch in accordance with a position of the corresponding control bit so as to produce a larger discharge current in response to a higher-order control bit of the bias current control signal.

23 Claims, 6 Drawing Sheets

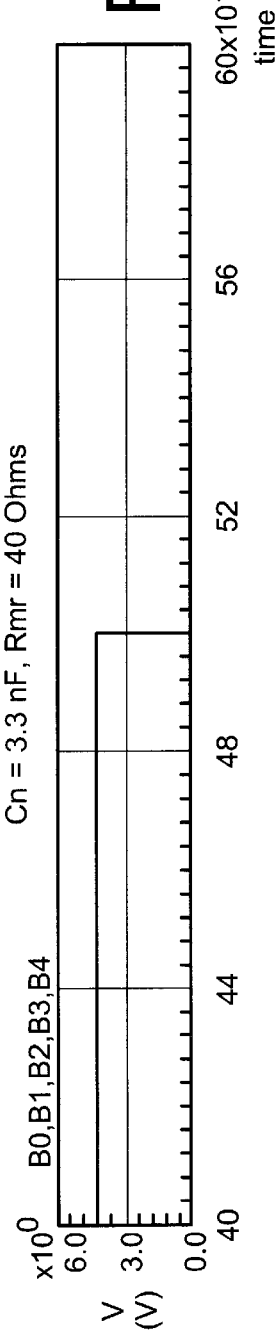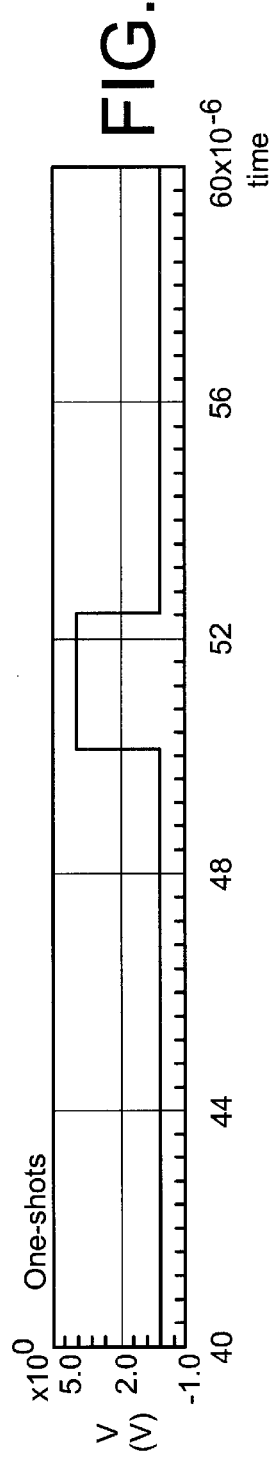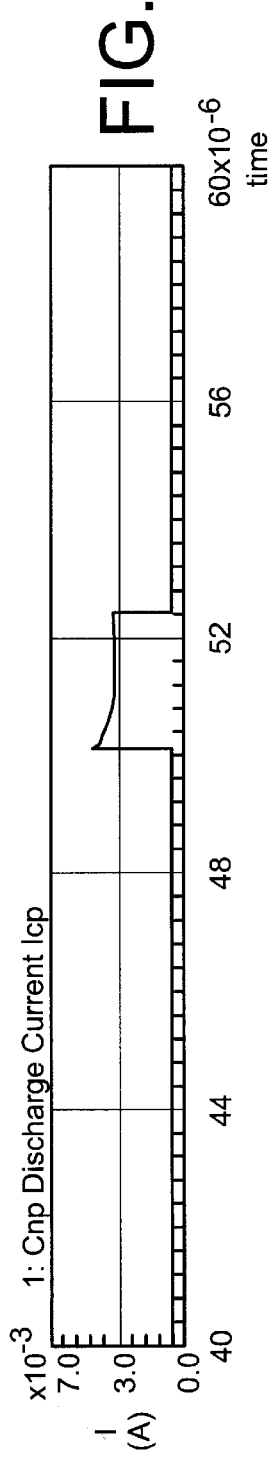

REDUCING BIAS CURRENT SETTLING TIME IN MAGNETO-RESISTIVE HEAD PRE-AMPLIFIERS

FIELD OF THE INVENTION

The present invention relates to data storage devices, and more particularly, to method and system for reducing bias current settling time in read pre-amplifiers for magneto-resistive (MR) disk drives.

BACKGROUND ART

MR heads operate on a physical phenomenon known as the magneto-resistive effect. Certain metals, when exposed to a magnetic field, change their resistance to the flow of electricity. This property is exploited in creating read heads for disc drives. To read information from the media, a read pre-amplifier coupled to the MR head contains a bias current generator that constantly supplies the MR head with a bias current. For example, the bias generator may provide a fixed value of the bias current. When the MR head passes over a magnetic field on the media, the head changes its resistance. As the bias current has a fixed value, variations in the resistance of the MR head lead to change in the voltage produced across the MR head. The read pre-amplifier may comprise a voltage amplifier to amplify this voltage to an appropriate level.

A big advantage of MR heads is their ability to read signals when bits are packed closely together. MR heads also able to better distinguish bits between closely spaced adjacent tracks. As a result, designers can build MR drives with higher data density than using conventional inductive read heads.

The interface requirements for an MR head are significantly different from those of conventional inductive read heads. The bias current passing through the MR head must be set correctly to obtain a linear dependence of the output signal on the magnetic field of the media. Incorrect biasing will result in voltage pulses with distorted shapes and amplitudes.

As MR heads have a large tolerance in their magneto-resistive characteristics, a unique bias current (Imr) is required for each MR head used in a disk drive. In a disk drive containing multiple MR heads, a new Imr value should be set after each head change.

Any noise in the bias current is amplified 200 times or more and seen at the output of the read pre-amplifier. Therefore, the read pre-amplifier must utilize a large capacitor in parallel with the MR head to shunt noise that could be induced in the bias current. Large time constants resulting from these large noise shunting capacitors make it difficult to change heads and bias current values at high speeds. The time period needed for the bias, current to reach a steady state level after initiating an Imr change is called the bias current settling time.

For example, a timing diagram in FIG. 1 illustrates a simulated bias current transition from 12 mA to 5 mA for a noise shunting capacitor Cn=3.3 pF. As shown in the timing diagram, it takes 6.7 $\mu$sec for a bias current Imr to reach a steady state level at 105% of 5 mA.

As transfer rates of MR disk drive systems increase, pre-amplifiers must be able to set bias currents at higher speeds after changing MR heads. Therefore, it would be desirable to provide a system that reduces the bias current settling time.

Moreover, a system for reducing the bias current settling time would allow a larger capacitor to be used for noise shunting. As a result, a noise sensitivity of an MR head read pre-amplifier would be reduced.

DISCLOSURE OF THE INVENTION

Accordingly, the advantage of the present invention is in providing a system for reducing bias current settling time in an MR head read pre-amplifier.

Another advantage of the present invention is in providing an MR head read pre-amplifier having a large noise shunting capacitor to reduce a noise sensitivity.

These and other advantages of the present invention are achieved at least in part by providing a novel arrangement for reading data from a magnetic data carrier. This arrangement includes a magneto-resistive (NM) head and a bias current source for supplying the MR head with a bias current. The bias current source is controlled by a bias current control signal from a bias current controller to adjust a value of the bias current for a particular MR head. A noise shunting capacitor is connected to the MR head to reduce a noise level. A discharging circuit coupled to the noise shunting capacitor is responsive to the bias current control signal for discharging the noise shunting capacitor when the bias current is being adjusted. As a result, the bias current settling time is reduced.

In the preferred embodiment, the bias current control signal comprises multiple control bits. The discharging circuit has at least one discharging switch for each control bit of the bias current control signal. This discharging switch is controlled by a pulse generator triggered by a falling edge of the corresponding control bit of the bias current control signal to produce a discharge current for discharging the noise shunting capacitor.

For example, the discharging circuit may comprise a pair of switches provided for each control bit of the bias current control signal. This pair includes a positive discharging switch coupled to a positive plate of the noise shunting capacitor and a negative discharging switch coupled to a negative plate of the noise shunting capacitor. The positive and negative discharging switches are controlled by the falling edge of the corresponding control bit to pull down a positive potential at the positive capacitor plate and to pull up a negative potential at the negative capacitor plate.

Preferably, a weighting element is coupled to each discharging switch for weighting a value of the discharge current produced by the switch in accordance with a position of the corresponding control bit. For example, the weighting element may be a resistor having a resistance value selected so as to produce a higher value of the discharge current in response to a higher-order control bit of the bias current control signal.

In another embodiment, a charging circuit coupled to the noise shunting capacitor is responsive to the bias current control signal for pre-charging the capacitor when the bias current is being adjusted. The charging circuit may comprise one charging switch for each control bit of the bias current control signal. The charging switch may be controlled by a pulse generator triggered by a rising edge of the corresponding control bit to produce a charge current for pre-charging the noise shunting capacitor. A weighting element may be coupled to each charging switch for weighting a value of the charge current in accordance with a position of the control bit so as to produce a larger charge current in response to a higher-order control bit.

In accordance with a method of the present invention, the following steps are carried out to reduce bias current settling time:

supplying a control signal to adjust the bias current, and discharging the noise shunting capacitor in response to a falling edge of the control signal.

Also, the capacitor may be pre-charged in response to a rising edge of the control signal.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIGS. 4A to 4E are timing diagrams illustrating operation of the biasing arrangement.

BEST MODE FOR CARRYING-OUT THE INVENTION

Figure 1:
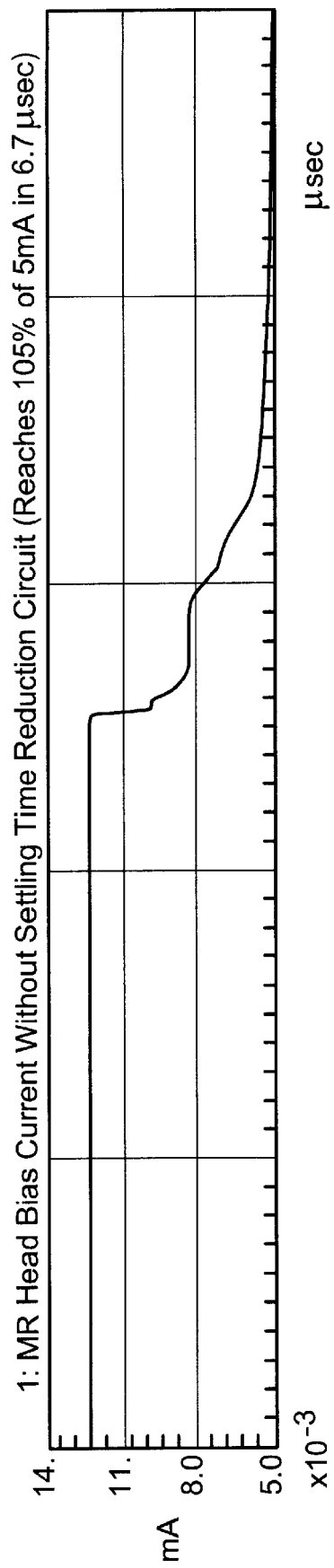
FIG. 1 is a timing diagram illustrating bias current settling time for a conventional MR head pre-amplifier.
Figure 2:
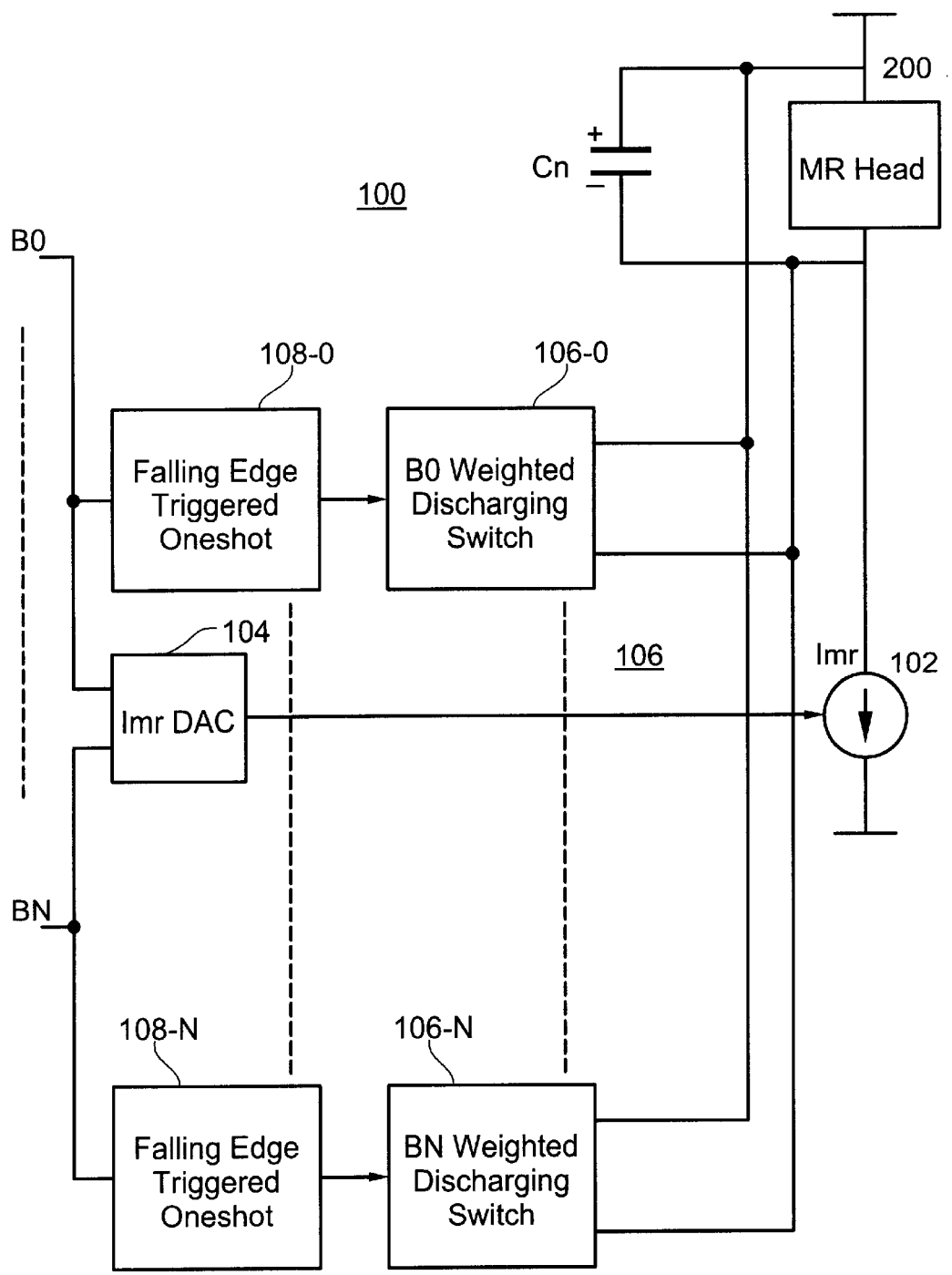
FIG. 2 is a diagram schematically showing a biasing arrangement for a MR disk drive in accordance with the present invention.

FIG. 2 schematically illustrates a biasing arrangement 100 of the present invention provided on a read pre-amplifier chip of an MR disk drive having an MR head 200 and a noise shunting capacitor Cn connected in parallel with the MR head 200. The biasing arrangement 100 comprises a bias current source 102 coupled to the MR head 200. For example, the bias current source 102 may provide a fixed value of the bias current. When the MR head 200 passes over a magnetic field on the media, the head 200 changes its resistance. Variations in the resistance value of the MR head 200 lead to change in the voltage produced across the MR head 200. The read pre-amplifier chip comprises a differential voltage amplifier (not shown) connected across the MR head 200 to amplify this voltage to an appropriate level.

Alternatively, a fixed voltage may be applied to the MR head 200. In this case, variations in the resistance value of the MR head 200 will cause changes in the bias current, which are detected to read data from the media.

The bias current source 102 supplies a unique bias current Imr required for a particular MR head 200. Conventionally, MR disk drives contain multiple MR heads that may have different nominal resistivities. Therefore, the bias current Imr must be adjusted after each MR head change. For example, spread in resistance values of different MR heads may require bias current changes in a range between 5 mA and 12 mA. An MR head having a large resistivity may need the bias current Imr as low as 5 mA, whereas an MR head with a low resistivity may require the bias current Imr of 12 mA.

To change the bias current Imr, the bias current source 102 is controlled by an external control device, such as a disk drive controller. For example, a manufacturer may test a disk drive to experimentally determine a bias current Imr required for each MR head in the disk drive. The test results may be stored in a memory or register of the disk drive.

During operations, the disk drive controller uses the stored Imr data to automatically adjust the bias current source 102 after each head change. The disk drive controller may provide multiple bias current control bits B0 to BN representing the bias current value required for a new MR head. For example, five bias current control bits B0 to B4 may be provided. The bias current control bits B0 to BN are supplied to a digital-to-analog Imr converter (Imr DAC) 104 which produces an analog Imr control signal provided to the bias current source 102 to adjust the Imr value.

As disk drive transfer rates increase, the bias current Imr must be adjusted at higher speeds. However, a large time constant caused by a large value of the noise shunting capacitor Cn tends to prolong Imr transient processes and increases the bias current settling time. To reduce the bias current settling time, the biasing arrangement 100 is provided with discharging circuitry 106 which includes weighted discharging switch circuits 106-0 to 106-N controlled by the bias current control bits B0 to BN. The bias current discharging circuitry is connected to the noise shunting capacitor Cn to quickly discharge the capacitor Cn after each bias current transition.

The discharging switch circuits 106-0 to 106-N are provided for each bias current control bit B0 to BN. In particular, the switch circuit 106-0 is responsive to the bias current control bit B0, the switch circuit 106-1 is responsive to the bias current control bit B1, etc. Finally, the switch circuit 106-N is responsive to the bias current control bit BN. As will be discussed in more detail later, each switch circuit 106-1 to 106-N comprises one switch connected to the positive plate of the capacitor Cn, and one switch connected to the negative plate of the capacitor Cp.

The switch circuits 106-1 to 106-N are respectively controlled by pulses produced by one-shot multivibrators 108-0 to 108-N triggered by falling edges of the bias current control bits B1 to BN, respectively. Thus, switches in the switch circuits 106-1 to 106-N change their state when the corresponding control bits B1 to BN go from a logic 1 level to a logic 0 level.

As will be discussed in more detail later, a current pulse is produced at the output of each switch closed in response to a transition of the corresponding control bit from a logic 1 level to a logic 0 level. The current pulses are summed, and a resulting current is supplied to the capacitor Cn to pull down a potential on its positive plate and pull up a potential on its negative plate. As a result, when the bias current control bits B0 to BN are supplied to adjust the bias current Imr, the capacitor Cn is discharged faster to reduce the Imr settling time.

A current value caused by closing switches in the switch circuits 106-0 to 106-N is weighted in accordance with the position of the bias current control bit B0 to BN corresponding to that switch pair. The switch circuit corresponding to a higher-order control bit causes a larger current value than the switch circuit corresponding to a lower-order control bit. In particular, the switch circuit 106-0 causes less current than the switch circuit 106-1, which in turn causes less current than the switch circuit 106-2, etc. For example, the switch circuit 106-4 is weighted to produce 16 times as much current as the switch circuit 106-0.

A transition of a higher-order control bit causes a larger transition of the bias current Imr, which leads to a larger bias current settling time. Therefore, in accordance with the present invention, a transition of a higher-order control bit is accompanied by a larger current value at the output of the discharging switch circuit. As a result, the discharge of the noise shunt capacitor is performed quicker to reduce the bias current settling time to a larger extent. Thus, the rate of discharging the noise shunting capacitor Cn is proportional to the amount of a bias current change.

Figure 3:
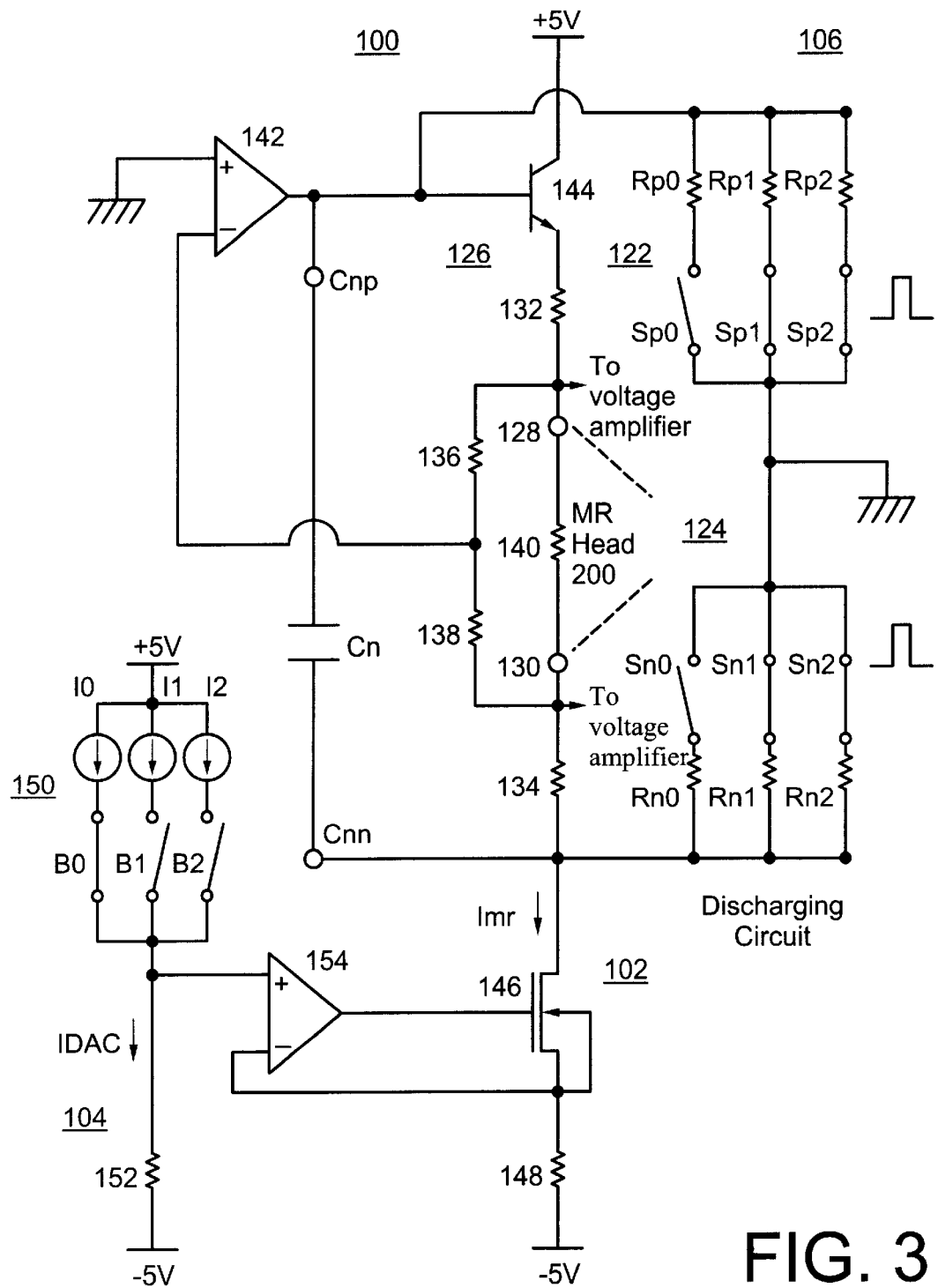
FIG. 3 is a diagram showing the biasing arrangement of the present invention in more detail.

Referring to FIG. 3 that shows the biasing arrangement 100 in more detail, the discharging circuitry 106 comprises a positive switch bank 122 coupled to the positive plate Cnp of the noise shunting capacitor Cn, and a negative switch bank 124 coupled to the negative plate Cnn of the capacitor Cn. Each of the switch banks 122 and 124 comprises multiple switches respectively responsive to pulses produced by the one-shot multivibrators 108-0 to 108-N. For example, for a 3-bit bias current control signal represented by bits B0, B1 and B2, the positive switch bank 122 comprises switches Sp0, Sp1 and Sp2, and the negative switch bank 124 comprises switches Sn0, Sn1 and Sn2. The switches Sp0 and Sn0 are controlled by a pulse produced by the one-shot multivibrator 108-0 triggered by the falling edge of the least-significant bias current control bit B0, the switches Sp1 and Sn1 are controlled by the one-shot multivibrator 108-1 triggered by the falling edge of the bias current control bit B1, and the switches Sp2 and Sn2 are controlled by the one-shot multivibrator 108-2 triggered by the falling edge of the bias current control bit B2. For example, NMOS transistors may be used to implement the switches Sp0, Sp1 and Sp2, and PMOS transistors may be employed to implement the switches Sn0, Sn1 and Sn2. The switches Sp0, Sp1 and Sp2, and Sn0, Sn1 and Sn2 are normally open. They are closed in response to pulses produced by the one-shot multivibrators 108-0, 108-1 and 108-2.

The positive switch bank 122 also comprises weighting resistors Rp0, Rp1 and Rp2 respectively connected in series with the switches Sp0, Sp1 and Sp2, and the negative switch bank 124 comprises weighting resistors Rn0, Rn1 and Rn2 respectively connected in series with the switches Sn0, Sn1 and Sn2. As will be discussed in more detail later, resistance values of the weighting resistors are selected to produce current values weighted in accordance with the position of the corresponding bias current control bits B0 to BN.

Further, the biasing arrangement 100 comprises MR head circuitry 126 that supports an interface with the MR head 200 connectable via terminals 128 and 130. The MR head circuitry 126 comprises resistors 132 and 134 connected in series with the MR head 200, resistors 136 and 138 connected in parallel with the MR head 200, and a resistor 140 coupled between the terminals 128 and 130. A differential voltage amplifier (not shown) for amplifying voltage produced across the MR head 200 may be connected between the terminals 128 and 130. Resistance values of the resistors 132 to 138 are selected to optimize noise performance of the read pre-amplifier for a particular MR head 200. Separate MR head circuitry 126 may be provided for each MR head 200 of the MR disk drive.

An operational amplifier 142 is employed to maintain the MR head 200 at a ground potential. The amplifier 142 has an inverting input connected to a node between resistors 136 and 138 and a grounded non-inverting input. An NPN transistor 144 provides a negative feedback between the output of the amplifier 142 and its inverting terminal to pull a potential at the inverting 15 terminal closer to a ground potential. The transistor 144 has a base connected to the output of the operational amplifier 142, an emitter coupled to the terminal 128 via the resistor 132 and a collector connected to a +5 V voltage supply source.

The positive plate Cnp of the noise shunting capacitor Cn is connected to the base of the NPN transistor 144, whereas the negative plate Cnn of the capacitor Cn is coupled between the resistor 134 and the bias current source 102 that includes a MOSFET transistor 146 coupled between the MR head 200 and a −5 V voltage supply source. A resistor 148 is provided between the voltage supply source and the transistor 146.

A bias current Imr supplied by the bias current source 102 is controlled by the Imr DAC 104, which may be schematically represented by a switch bank 150 having multiple switches B0 to BN responsive to the bias current control bits B0 to BN. For example, FIG. 3 shows the switches B0, B1 and B2 respectively controlled by the bias current control bits B0, B1 and B2. MOS transistors may be employed as the switches of the switch bank 150.

Constant current sources I0, I1 and I2 are connected between the switches B0, B1 and B2, respectively, and the +5 V voltage supply source to produce a resulting current IDAC supplied from the bias current DAC 104. A resistor 152 is provided between the switch bank 150 and the −5 V voltage supply source. An operational amplifier 154 having its non-inverting input connected to a node between the bank switch 150 and the resistor 152 acts as a current multiplier that multiplies the IDAC current to produce the bias current Imr. The inverting input of the operating amplifier 154 is coupled to a node between the transistor 146 and the resistor 148. For example, the operational amplifier 152 may multiply the IDAC current by 10 to control the transistor 146 so as to produce the Imr current, which is 10 times larger than the IDAC current. In this case, the resistors 148 and 152 may be 5 kOhm and 500 Ohm, respectively.

When any of the bias current control bits are at a logic 1 level, the corresponding switches of the switch bank 150 are closed. For example, when all bias current control bits are set to a logic 1 level, the IDAC current produced by the Imr DAC 104 is at its maximum level. Thus, the Imr current has the maximum value. When some of the bias current control bits are reset to logic 0, the corresponding switches of the switch bank 150 go into an open state, reducing the IDAC current to decrease the Imr current.

In an example illustrated in FIG. 3, the current bias. control bits B1 and B2 reset to a logic 0 level open the switches B1 and B2. Falling edges produced when the bits B1 and B2 switch from a logic 1 level to a logic 0 level trigger one-shot multivibrators 108-1 and 108-2 to close the switches Sp1, Sp2, Sn1 and Sn2. As a result, discharge currents Icp1 and Icp2 flow through the closed switches Sp1 and Sp2, and the resistors Rp1 and Rp2, respectively, between the ground terminal and the positive plate Cnp of the noise shunting capacitor Cn to pull down a positive potential at the plate Cnp to the ground potential. Further, discharge currents Icn1 and Icn2 flow through the closed switches Sn1 and Sn2, and the resistors Rn1 and Rn2, respectively, between the ground terminal and the negative plate Cnn of the noise shunting capacitor Cn to pull up a negative potential at the plate Cnn to the ground potential. These discharge currents cause the noise shunting capacitor Cn to discharge quicker. Thus, the Imr settling time is reduced.

Resistance values of the resistors Rp0, Rp1, Rp2 and Rn0, Rn1, Rn2 are selected to weight the current flowing through the switches Sp0, Sp1, Sp2 and Sn0, Sn1, Sn2, respectively, in accordance with the position of the corresponding bias current control bits B0, B1 and B2. The resistors may be selected using simulation performed so as to achieve a required Imr settling time for a particular capacitor Cn and a particular MR head 200. For example, the following steps may be carried out to select resistance values of the resistors Rp0, Rp1, Rp2, Rn0, Rn1 and Rn2. First, simulation is performed to find equivalent resistance Reqp of the positive switch bank 122 and equivalent resistance Reqn of the negative switch bank 124 required to achieve a selected Imr settling time when the Imr changes from its maximum value (bits B0, B1 and B2 are all at a logic 1 level) to its minimum value (bits B0, B1 and B2 are all at a logic 0 level) without bias current undershoot. Also, Then, it is assumed that $$Reqp = \frac{1}{1/Rp0 + 1/Rp1 + 1/Rp2} \text{ and} \quad (1)$$

$$Reqn = \frac{1}{1/Rn0 + 1/Rn1 + 1/Rn2}, \quad (2)$$

where Rp1=2 Rp2, Rp0=$2^2$ Rp2, and
Rn1=2 Rn2, Rn0=$2^2$ Rn2.

Thereafter, simulation is performed to determine resistance values of the resistors Rp2 and Rn2 required to achieve a required Imr settling time when the bit B2 goes from a logic 1 level to a logic 0 level, without bias current undershoot. Then, Rp0, Rp1, Rn0 and Rn1 may be calculated.

For example, for Reqp=514 Ohm, Rp2, Rp1 and Rp0 may be 0.9 kOhm, 1.8 kOhm, and 3.6 kOhm, respectively. As a result, the discharge current Icp2 flowing through the closed switch Sp2 is two times as large as the discharge current Icp1 flowing through the closed switch Sp1, and two times as large as the discharge current Icp0 flowing through the closed switch Sp0.

A transition of a higher-order bias current control bit from a logic 1 level to a logic 0 level causes a larger change in the bias current Imr, which leads to a larger bias current settling time. Therefore, in accordance with the present invention, a transition of a higher-order control bit is accompanied by a larger discharge current value. As a result, the discharge of the noise shunt capacitor is performed quicker to reduce the bias current settling time to a larger extent. Thus, the rate of discharging the noise shunting capacitor Cn is proportional to the amount of a bias current change.

Referring to FIGS. 4A to 4E, the operation of the bias current discharging circuitry 106 is illustrated with an example of simulation performed to switch the bias current Imr from its maximum value to its minimum value using a 5-bit current bias control signal [B0:B4]. In this example, to support reading from an MR head having resistance Rmr=40 Ohms, the bias current Imr goes from 12 mA to 5 mA. The noise shunting capacitance Cn=3.3 nF.

Figure 4D:
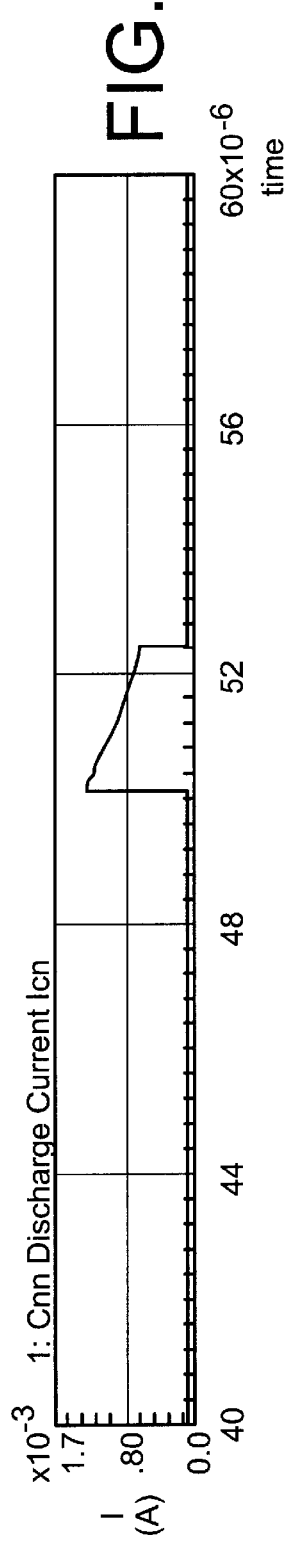
Figure 4E:
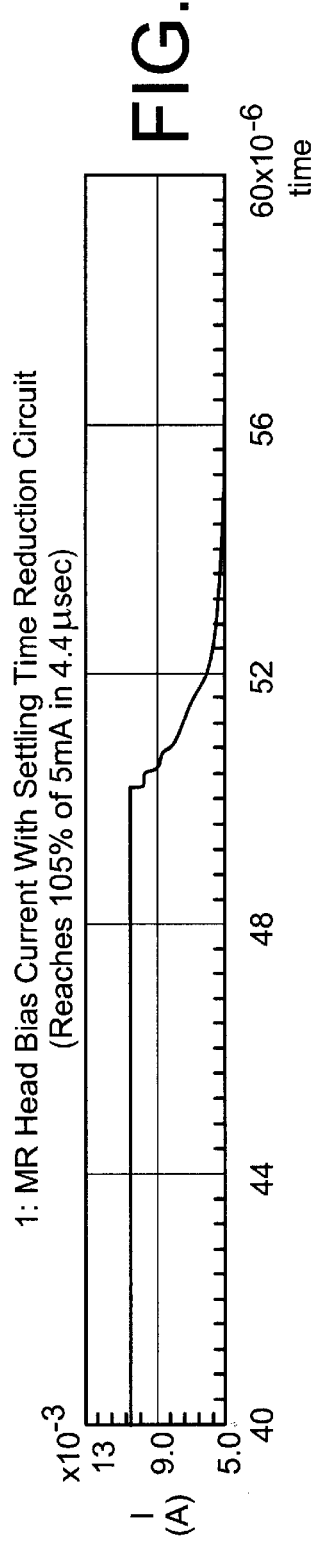

As shown in FIG. 4A, when the Imr has its maximum value, all bias current control bits are asserted at a logic 1 level. To switch the Imr to its minimum value, all bias control bits are reset to a logic 0 level. Falling edges of the bias control bits going from a logic 1 level to a logic 6 level trigger the corresponding one-shot multivibrators 108, each of which produces a pulse (FIG. 4B) closing the corresponding switches of the positive and negative switch banks 122 and 124. FIGS. 4C and 4D respectively show resulting discharge current pulses Icp and Icn applied to the positive and negative plates Cnp and Cnn of the noise shunting capacitor Cn when all of the switches are closed. The discharge current pulse Icp tends to reduce a positive potential at the positive plate Cnp to a ground level, whereas the discharge current pulse Icn tends to increase a negative potential at the negative plate Cnn to the ground level. Thus, the rate of discharging the noise shunting capacitor Cn is substantially increased compared with a MR pre-amplifier without discharging circuitry. As a result, as shown in FIG. 4E, the bias current Imr reaches a steady state level equal to 105% of 5 mA in 4.4 μsec.

Figure 5:
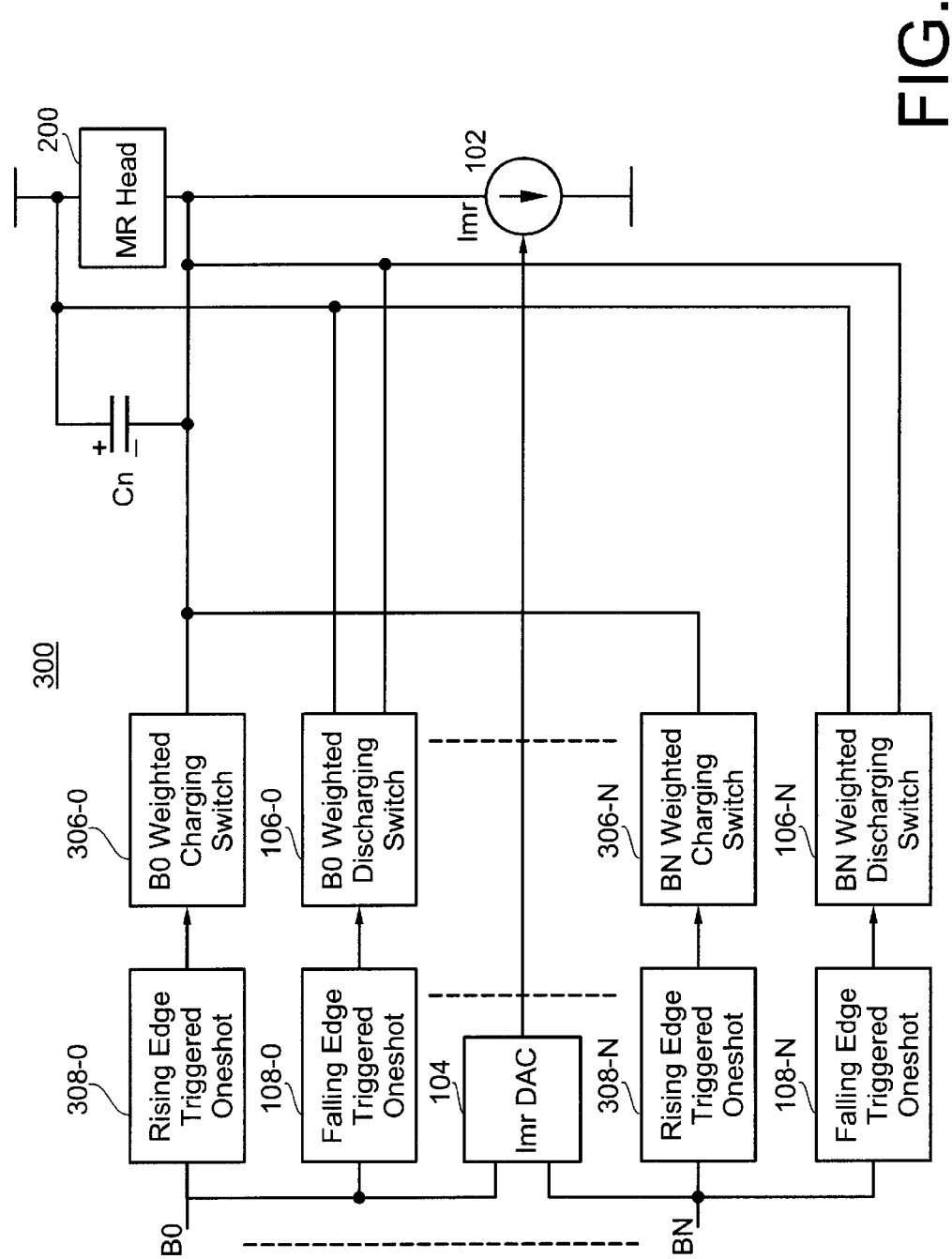
FIG. 5 is a diagram of another embodiment implementing the biasing arrangement of the present invention.

A biasing arrangement 300 implementing another embodiment of the present invention is illustrated in FIG. 5, wherein elements similar to those depicted in FIG. 2 bear like reference numerals. In addition to the discharging circuitry 106 which includes the weighted discharging switch circuits 106-0 to 106-N controlled by the one-shot multivibrators 108-0 to 108-N, the biasing arrangement 300 comprises charging circuitry 306 that pre-charges the noise shunting capacitor Cn when the bias current Imr is adjusted after each MR head change. The charging circuitry 106 comprises weighted charging switches 306-0 to 306-N responsive to the bias current control bits B0 to BN, respectively. The switches 306-0 to 306-N are controlled by pulses produced by one-shot multivibrators 308-0 to 308-N triggered by rising edges of the bias current control bits B0 to BN, respectively. The switches 306-0 to 306-N may be connected between a voltage supply source and one of the plates of the noise shunting capacitor Cn, for example, the negative plate.

Rising edges produced when any of the control bits B0 to BN are switched from a logic 0 state to a logic 1 state trigger the corresponding one-shot multivibrators 308-0 to 308-N. When any of the switches 306-0 to 306N are closed in response to pulses provided by the one-shot multivibrators 308-0 to 308-N, a charging current pulse is applied to the negative plate of the capacitor Cn. The charging current pulse results in increasing the voltage across the capacitor Cn to pre-charge the capacitor Cn before it being charged with the bias current Imr. Thus, the capacitor Cn is charged faster. As a result, the Imr settling time is reduced.

Weighting resistors R0 to RN may be connected in series with the switches 306-0 to 306-N to weight a response to a bias current control bit depending on the position of the bit. For example, resistance values of the resistors R0 to RN may be selected so as to produce a charge current pulse in response to the rising edge of a higher-order bias current control bit having a larger value than a charge current pulse formed in response to a lower-order bias current control bit.

As discussed above, a transition of a higher-order control bit causes a larger change in the bias current Imr, which leads to a larger bias current settling time. Therefore, a larger charge current value in response to a transition of a higher-order control bit reduces the bias current settling time to a larger extent. Thus, in accordance with the present invention, the rate of pre-charging the noise shunting capacitor Cn is proportional to the amount of a bias current change.

Thus, the biasing arrangement 300 provides not only faster discharging of the noise shunting capacitor using the discharging circuitry 106 but also pre-charging of this capacitor using the charging circuitry 306. Pre-charging of the noise shunting capacitor in response to rising edges of one group of the bias current control bits may be followed by discharging of this capacitor in response to falling edges of another group of the bias current control bits to further reduce the Imr settling time.

There accordingly has been described an arrangement for reading data from a magnetic data carrier using a magnetoresistive (MR) head. A bias current source supplies the MR head with a bias current adjustable after MR head change. A bias current control signal having multiple control bits is used for adjusting the bias current. A noise shunting capacitor is connected to the MR head for reducing noise caused by the bias current. A discharging circuit is coupled to the noise shunting capacitor to discharge the capacitor when the bias current is being adjusted, in order to reduce bias current settling time. The discharging circuit comprises a pair of discharging switches for each control bit of the bias current control signal. One of the discharging switches is connected to a positive plate of the noise shunting capacitor, and another switch is coupled to a negative plate of the capacitor. The discharging switches are controlled by a discharge one-shot multivibrator triggered by a falling edge of the corresponding control bit. Weighting resistors are connected to each discharging switch for weighting a discharge current produced by the switch in accordance with a position of the corresponding control bit so as to produce a larger discharge current in response to a higher-order control bit of the bias current control signal. A charging circuit may be connected to the noise shunting capacitor to pre-charge the capacitor when the bias current being adjusted. The charging circuit comprises a charging switch for each control bit of the bias current control signal. The switch is controlled by a charge one-shot multivibrator triggered by a rising edge of the corresponding control bit. Weighting resistors are connected to each charging switch for weighting a discharge current produced by the switch in accordance with a position of the corresponding control bit so as to produce a larger charge current in response to a higher-order control bit of the bias current control signal.

In this disclosure, there shown and described only the preferred embodiments of the invention, but it is understood that the invention is capable of changes and modifications within the scope of the inventive concept as expressed herein.

What is claimed is:

1. An arrangement for reading data from a magnetic data carrier, comprising:
    a magneto-resistive (MR) head,
    a bias current source for supplying said MR head with a bias current, said bias current source being supplied with a bias current control signal from a bias current controller to adjust a value of the bias current,
    a noise shunting capacitor connected to said MR head to reduce a noise level, and
    a discharging circuit coupled to said noise shunting capacitor and responsive to said bias current control signal for discharging said noise shunting capacitor when the bias current is being adjusted.

2. The arrangement of claim 1, wherein said bias current control signal comprises multiple control bits.

3. The arrangement of claim 2, wherein said discharging circuit comprises at least one discharging switch for each control bit of said bias current control signal.

4. The arrangement of claim 3, wherein said at least one discharging switch is responsive to a falling edge of a corresponding control bit of said bias current control signal.

5. The arrangement of claim 4, further comprising a discharge pulse generator provided for each control bit of said bias current control signal to produce a discharge pulse signal in response to the falling edge of the corresponding control bit.

6. The arrangement of claim 5, wherein said at least one discharging switch is controlled by said discharge pulse signal to produce a discharge current for discharging said noise shunting capacitor.

7. The arrangement of claim 6, wherein said discharging circuit comprises a weighting element coupled to said at least one discharging switch for weighting a value of the discharge current produced by said at least one discharging switch in accordance with a position of the control bit corresponding to said at least one discharging switch.

8. The arrangement of claim 7, wherein said weighting element comprises a resistor coupled to said at least one discharging switch and having a resistance value selected so as to produce a higher value of the discharge current in response to a higher-order control bit of said bias current control signal.

9. The arrangement of claim 6, further comprising a digital-to-analog converter responsive to the control bits of said bias current control signal to produce an analog signal for controlling the bias current.

10. The arrangement of claim 9, wherein said discharging circuit comprises a positive discharging switch coupled to a positive plate of said noise shunting capacitor and a negative discharging switch coupled to a negative plate of said noise shunting capacitor.

11. The arrangement of claim 10, wherein said positive discharge switch and said negative discharge switch are provided for each control bit of said bias current control signal.

12. The arrangement of claim 11, wherein said positive discharge switch is controlled by a falling edge of a corresponding control bit to pull down a positive potential at the positive plate of the noise shunting capacitor.

13. The arrangement of claim 12, wherein said negative discharge switch is controlled by the falling edge of the corresponding control bit to pull up a negative potential at the negative plate of the noise shunting capacitor.

14. The arrangement of claim 3, further comprising a charging circuit coupled to said noise shunting capacitor and responsive to said bias current control signal for pre-charging said capacitor when the bias current is being adjusted.

15. The arrangement of claim 14, wherein said charging circuit comprises at least one charging switch for each control bit of said bias current control signal.

16. The arrangement of claim 15, wherein said charging switch is responsive to a rising edge of a corresponding control bit of said bias current control signal.

17. The arrangement of claim 16, further comprising a charge pulse generator provided for each control bit of said bias current control signal to produce a charge pulse signal in response to the rising edge of the corresponding control bit.

18. The arrangement of claim 17, wherein said at least one charging switch is controlled by said charge pulse signal to produce a charge current for pre-charging said noise shunting capacitor.

19. The arrangement of claim 17, wherein said charging circuit comprises a weighting element coupled to said at least one charging switch for weighting a value of the charge current produced by said at least one charging switch in accordance with a position of the control bit corresponding to said at least one charging switch.

20. An MR disk drive comprising:
    an MR head for reading data from a magnetic data carrier,
    a bias current generator for supplying the MR head with a bias current, said bias current generator being responsive to a control signal for changing said bias current in accordance with a value of said control signal,
    a capacitor connected to said MR head for reducing a level of noise caused by the bias current, and
    a discharging circuit controlled by a falling edge of the control signal for discharging said capacitor.

21. The arrangement of claim 20, further comprising a charging circuit controlled by a rising edge of said control signal for pre-charging said capacitor.

22. In an arrangement for reading data from a magnetic data carrier having an MR head supplied with a bias current adjustable in response to a control signal and a capacitor for reducing noise caused by the bias current, a method of reducing bias current settling time comprising the steps of:

supplying the control signal to adjust the bias current, and discharging the capacitor in response to a falling edge of the control signal.

23. The method of claim 22, further comprising the step of pre-charging the capacitor in response to a rising edge of the control signal.

\* \* \* \* \*